US012529421B2

(12) United States Patent
Lister et al.

(10) Patent No.: US 12,529,421 B2
(45) Date of Patent: Jan. 20, 2026

(54) ELECTRIC POWERTRAIN AND METHOD OF CALIBRATION

(71) Applicant: Caterpillar Inc., Peoria, IL (US)

(72) Inventors: Brian E. Lister, Edwards, IL (US); Bernard M. Murphy, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 55 days.

(21) Appl. No.: 18/677,831

(22) Filed: May 29, 2024

(65) Prior Publication Data

US 2025/0369513 A1  Dec. 4, 2025

(51) Int. Cl.
F16H 61/30 (2006.01)
B60L 15/20 (2006.01)
F16H 59/40 (2006.01)
F16H 59/42 (2006.01)
F16H 59/56 (2006.01)
F16H 59/14 (2006.01)
F16H 61/28 (2006.01)

(52) U.S. Cl.
CPC .............. F16H 61/30 (2013.01); B60L 15/20 (2013.01); F16H 59/40 (2013.01); F16H 59/42 (2013.01); F16H 59/56 (2013.01); F16H 2059/148 (2013.01); F16H 2061/283 (2013.01)

(58) Field of Classification Search
CPC .... F16H 2061/283; F16H 61/30; F16H 59/40; F16H 59/42; F16H 59/56; B60L 15/20
See application file for complete search history.

(56) References Cited

U.S. PATENT DOCUMENTS

| 5,737,979 | A | 4/1998 | McKenzie et al. |
| 5,738,605 | A | 4/1998 | Fliearman et al. |
| 5,841,201 | A | 11/1998 | Tabata et al. |
| 6,216,074 | B1 | 4/2001 | Hillman et al. |
| 6,626,036 | B2 | 9/2003 | Milender et al. |
| 7,261,670 | B2 | 8/2007 | Endo et al. |
| 7,574,906 | B2 | 8/2009 | Dourra et al. |
| 8,221,285 | B2 | 7/2012 | Heap et al. |
| 8,414,449 | B2 | 4/2013 | Heap et al. |

(Continued)

FOREIGN PATENT DOCUMENTS

| CN | 112594370 A | 4/2021 |
| DE | 102021117343 A1 | 1/2022 |

OTHER PUBLICATIONS

Written Opinion and International Search Report for Int'l. Patent Appln. No. PCT/US2025/027225, mailed Aug. 29, 2025 (12 pgs).

Primary Examiner — Tan Q Nguyen
(74) Attorney, Agent, or Firm — Leydig, Voit & Mayer, LTD.

(57) ABSTRACT

An electric powertrain includes a transmission connected with a traction motor to receive motive power embodied as torque and speed. To adjust the torque and speed, the transmission has a plurality of gear sets that are selectively engaged by actuation of associated hydraulic clutches. For actuation, the hydraulic clutches receive hydraulic fluid from a hydraulic system. To calibrate actuation of the clutches, the traction motor is run at a reduced speed range under calibration conditions while the hydraulic system is operated at a operational speed range. Further, a torque/current limit is applied to the traction motor to limit torque applied to the transmission during calibration.

20 Claims, 4 Drawing Sheets

(56) References Cited

U.S. PATENT DOCUMENTS

| | | | |
|---|---|---|---|
| 8,874,295 B2 | 10/2014 | Terakawa et al. | |
| 8,950,561 B2 | 2/2015 | Lister et al. | |
| 9,216,734 B2 | 12/2015 | Tsuda et al. | |
| 10,190,645 B2 | 1/2019 | Lister | |
| 11,548,519 B2* | 1/2023 | Ruiters | B60W 10/08 |
| 2008/0194384 A1 | 8/2008 | League et al. | |
| 2009/0159389 A1* | 6/2009 | Imediegwu | F15B 13/0433 |
| | | | 192/3.58 |
| 2012/0158264 A1* | 6/2012 | Kuras | F16D 48/066 |
| | | | 701/67 |
| 2024/0125381 A1 | 4/2024 | Lister et al. | |

* cited by examiner

ELECTRIC POWERTRAIN AND METHOD OF CALIBRATION

TECHNICAL FIELD

This patent disclosure relates generally to an electric powertrain for a mobile machine and more specifically to a system and method of calibrating actuation of a hydraulic clutch associated with an electric powertrain.

BACKGROUND

Mobile machines such as those used in construction, mining, or agriculture will include a powertrain that transmits the motive power embodied as rotational motion and torque that is generated by a power source to the point of utilization or final drive, for example, wheels or continuous tracks for propelling the mobile machine. The powertrain itself includes components such as rotating shafts, a transmission, and differentials to adjust and redirect the motive power. For example, the transmission is configured to adjust and change the torque and speed characteristics of the motive power being transmitted through the powertrain. A conventional transmission may include a plurality of gear sets that can be selectively engaged in different ratios to increase or decrease the rotational speed and, in an inverse relation, the torque. The transmission may also include forward and reverse gear sets that change the rotational direction of the motive power.

To enable the selective engagement and disengagement of the gear sets, the transmission can include one or more clutches that can operatively connect or release rotating components such as shafts or gears that are moving relative to each other. A common example of a clutch is a hydraulic clutch that utilizes pressurized hydraulic fluid to move the rotating components together and apart. The hydraulic clutch has a clutch actuator that receives or discharges the hydraulic fluid in accordance with a fill sequence.

To set the timing with which the hydraulic clutch engages and/or disengages the gear sets, the clutch sequence can be calibrated during assembly of the transmission or as part of service or maintenance. For example, if the hydraulic clutch engages prematurely by filling too quickly with hydraulic fluid, the transmitted torque may suddenly spike causing the mobile machine to jerk or lurch. Likewise, if the hydraulic clutch experiences a late fill event such that it is unable accepted the full torque transmission, the mobile machine may lug or temporarily drag before full torque transmission is restored. Calibration of the clutch fill sequence ensures that actuation of the clutch is synchronized with timing of the engagement and disengagement of the gear sets.

In conventional mobile machines, the power source may be an internal combustion engine that combusts a hydrocarbon-based fuel to produce the motive force transmitted through the powertrain. In such an arrangement, the generated motive force may also be used to operate the hydraulic system that actuates the hydraulic clutch. In some mobile machines, however, the power source may be electrical, for example, a battery or generator that generates electrical power to operate an electrical motor coupled to the powertrain. The present disclosure is directed to calibrating the clutch fill sequence of a hydraulic clutch arranged as part of an electrical powertrain.

SUMMARY

The disclosure describes, in one aspect, a method of calibrating a transmission for an electric powertrain. The method involves running a traction motor at a reduced speed range to direct motive power to the transmission while running a hydraulic pump at an operational speed range to pressurize hydraulic fluid. The method also involves applying an actuation current to a valve solenoid associated with a hydraulic valve to direct the hydraulic fluid to a clutch actuator and engage a hydraulic clutch. A transmission response variable is monitored and correlated a transmission response variable.

In yet a further aspect, the disclosure describes an electric powertrain including a transmission having a plurality of selectively engageable gear sets. A hydraulic clutch includes a plurality of clutch plates engageable with each other and clutch actuator to move the clutch plates into and out of engagement. The electric powertrain also includes a traction motor operatively connected to direct a motive force to the transmission which is configured to operate the traction motor at a reduced speed range. The electric powertrain is associated with a hydraulic system including a hydraulic pump fluidly connected to a hydraulic valve fluidly connected to the clutch actuator to direct hydraulic fluid thereto. The hydraulic valve is operated by a valve solenoid. The electric powertrain is also associated with an electronic controller configured to apply an actuation current to the valve solenoid and to correlate the transmission response variable with the actuation current.

In another aspect, the disclosure provides a method of operating a transmission including one or more hydraulic clutches associated with clutch actuators having clutch plates. The method involves conducting conducing a clutch filing segment to direct hydraulic fluid to the clutch actuator. The clutch filling segment is characterized by the plurality of clutch plates being spaced apart to freely rotate with respect to each other and incapable of transmitting a torque load. The method then next involves conducting a clutch touch-up segment to direct hydraulic fluid to the clutch actuator. The clutch touch-up segment is characterized by the plurality of clutch plates moving into initial contact by the hydraulic fluid but incapable of transmitting a torque load. The clutch touch-up segment includes a first touch-up stage characterized by a first actuator pressure within the clutch actuator and a second touch-up stage characterized a second actuator pressure level within the clutch actuator. The method concludes by conducting a clutch clamped segment directing hydraulic fluid to the clutch actuator. The clutch clamped segment is characterized by the plurality of clutch plates being clamped into rotation by the hydraulic fluid and capable of transmitting a torque.

DETAILED DESCRIPTION

Figure 1:
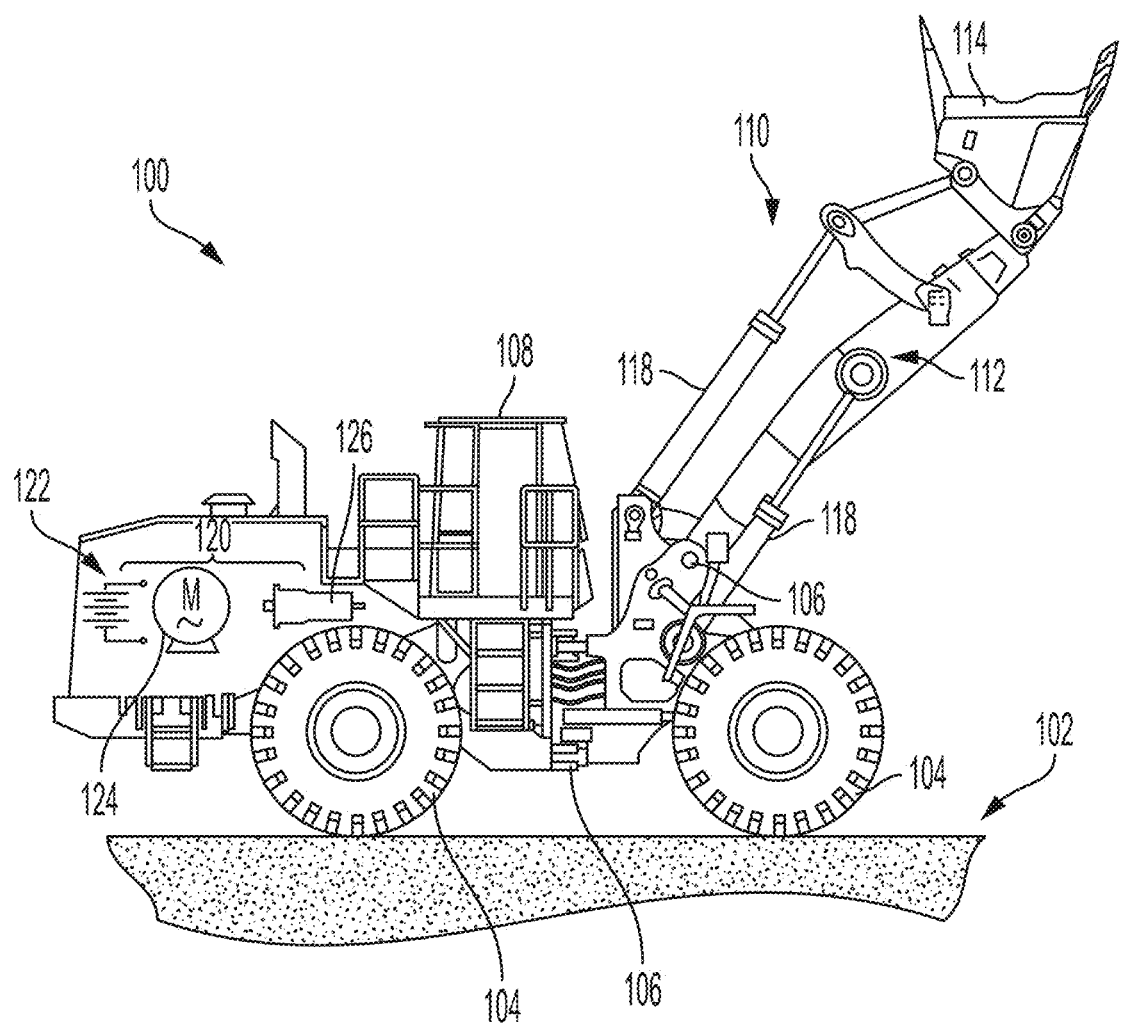
FIG. 1 is a side elevational view of a mobile machine such as a wheel loader that includes an electrically powered powertrain for transmitting motive power to a plurality of propulsion devices.

Now referring to the drawings, wherein whenever possible like reference numbers will refer to like elements, there is illustrated in FIG. 1 an example of a machine 100 and, in particular, a mobile machine embodied as a wheel loader for moving or loading materials such as rock, soil, or debris. While the illustrated mobile machine 100 is a wheel loader, in accordance with the disclosure the mobile machine can be any type of machine that performs some operation associated with an industry such as mining, construction, landscaping, agriculture, transportation, or any other industry known in the art. Examples of mobile machines 100 include dozers, excavators, dump trucks, haul trucks, motor graders, material handlers or the like.

To travel over the terrain surface 102 at a worksite, the mobile machine 100 includes a plurality of propulsion devices 104 that are rotatably connected to a machine frame 106 formed of rigid structural steel castings and beams arranged to carry the forces and loads applied to the mobile machine during operation. The propulsion devices 104 contact and can roll with respect to the terrain surface 102 thereby propelling the machine frame 106. Examples of suitable propulsion devices 104 include pneumatic wheels connected to the machine frame 106 by bearings or continuous tracks that can be caused to translate with respect to the machine frame by drive sprockets.

To accommodate an operator, an elevated cab or operator station 108 can be supported on the machine frame 106 in a position to provide visibility over the terrain surface 102. The operator station 108 can also accommodate various control devices and gauges for operating the mobile machine 100 such as steering wheels or joysticks, gears sticks, speedometers, and the like. In other embodiments, the mobile machine 100 can be configured for remote operation or autonomous or semi-autonomous operation.

To conduct operations at the worksite, the mobile machine 100 can be associated with a work implement such as a loading mechanism 110 for loading and dumping material with respect to the terrain surface 102. The loading mechanism 110 can include one or more elongated lift arms 112 that are pivotally coupled to the machine frame 106 at a proximal end and connected at the other distal end to a bucket 114 to accommodate material. To pivotally move the lift arms 114 and raise and lower the loading mechanism 110 with respect to the terrain surface 102, the loading mechanism can be operatively associated with one or more hydraulic actuators 118 such as hydraulic cylinders that can telescopically extend and retract by activation of pressurized hydraulic fluid. Examples of other suitable work implements that may be used on the mobile machine 100 for different tasks include compactors, fork lifting devices, brushes, grapples, cutters, shears, blades, breakers/hammers, augers, and others implements.

To provide power for operation of the mobile machine 100, an electrical powertrain 120 that generates and transmits a motive force can be fixedly attached to the machine frame 106 and operatively connected with propulsion devices 104 and/or the loading mechanism 110. The electric powertrain 120 includes a power source 122 that creates and provides energy in the form of electrical power for the powertrain. The power source 122 produces electrical power as either direct current or alternating current, and the alternating electric current can be single phase or polyphase electricity. A typically example of a power source 122 can be an electric battery that conducts a chemical reaction to generate electrical power, although as described below other types of electrical power sources can be utilized with the electric powertrain 120.

To convert the electrical power from the power source 122 to motive power in the form of torque and rotational motion, the electric powertrain 120 can include one or electric motors 124. The electric motor 124 may be an electromagnetic assembly in which the electric current is directed through conductive windings to generate a rotating magnetic field. The magnetic field can attract permanent magnets or magnetic materials disposed on a rotor causing rotation of the rotor as it follows the rotation of the magnetic field. The resulting rotational motion is output from a shaft protruding from the electric motor 124.

To adjust the motive power output by the electric motor 124, the electric powertrain 120 can include a transmission 126 disposed between the motor and the propulsion devices 104. The transmission 126 may be a mechanical transmission that includes a plurality of internal engageable gear sets that can adjust the rotational speed input from the electric motor 124, measured in RPMs for example, and in an inverse relation change the torque, measured in foot-pounds for example. The transmission 126 may be a fixed gear transmission with gears selectively engageable in fixed gear ratios or may be a continuously variable transmission (CVT) utilizing one or more planetary gear sets. In other examples, the transmission 126 may be a hydrostatic transmission that incorporates hydrostatic components such as a hydraulic pump and an associated motor, and other suitable components. In the example of a CVT, the transmission 126 can be associated with a plurality of distinct selectable virtual gear ratios that mimic the traditional fixed gear transmissions for operator convenience and familiarity.

Figure 2:
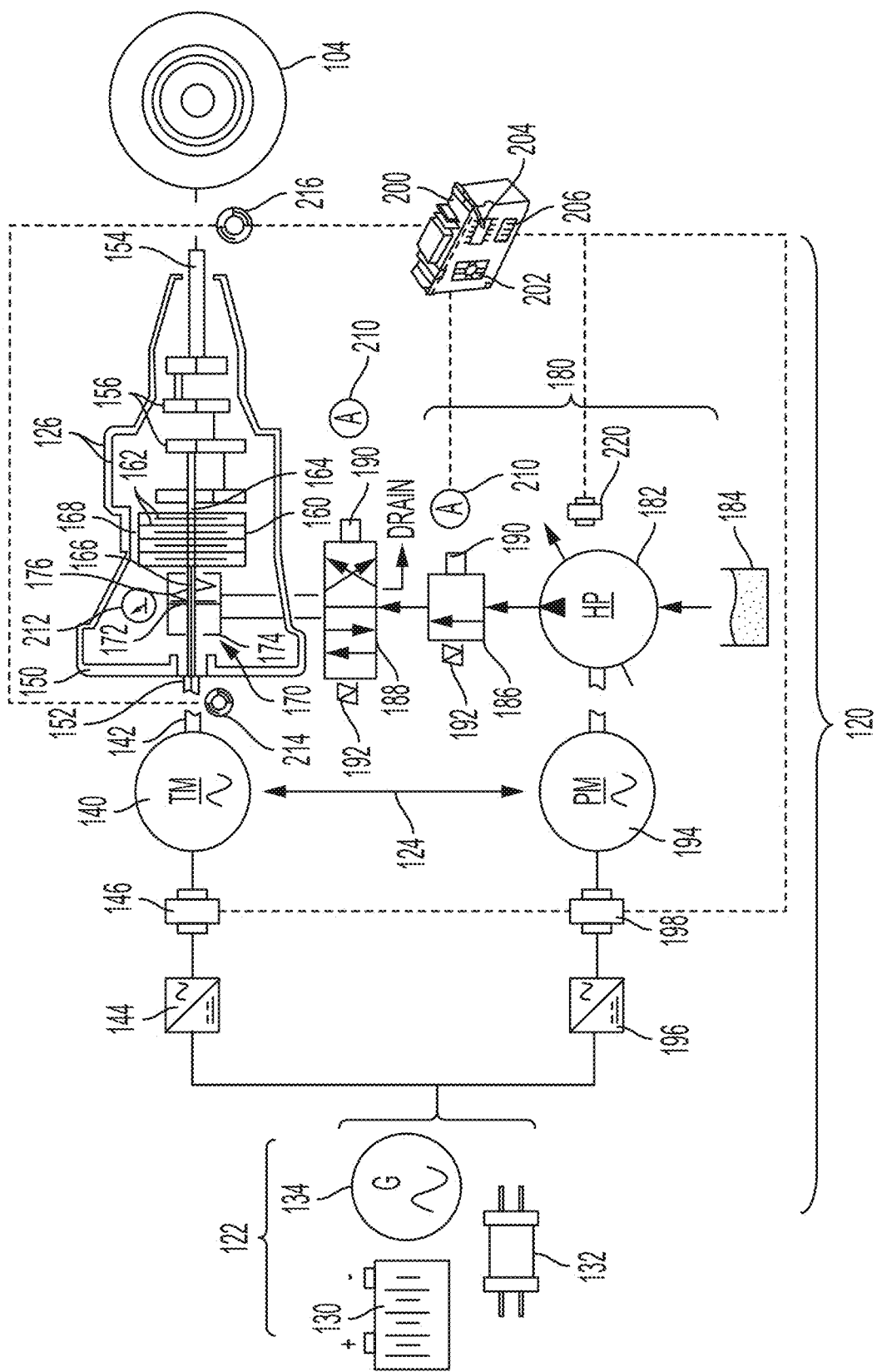
FIG. 2 is a schematic representation of the electric powertrain associated with the wheel loader in FIG. 1 which includes a mechanical transmission operatively associated with a hydraulic clutch.

Referring to FIG. 2, a schematic arrangement of the electric powertrain 120 and associated components is illustrated in greater detail. The power source 122 in the embodiment of a rechargeable electric battery 130 can store and discharge direct electric current through an electrochemical reaction. The rechargeable electric battery 130 can include a plurality of individual cells assembled from the positive and negative electrodes and the electrolyte arranged to conduct the electrochemical reaction when electrically connected in a closed circuit with a load. The rechargeable battery 132 can be periodically recharged from an external power source such as the electrical grid. In another example, the electrical power source 120 can be a fuel cell 132 that generates electricity by converting the chemical energy of a fuel such as hydrogen into electrical energy. In contrast to a rechargeable battery 132, the fuel of a fuel cell 132 must be periodically replenished.

In another configuration, the electrical power source 120 can be an electrical generator 134, which is similar to an electric motor and has an electromagnetic assembly that converts motive power into electrical power in the form of alternating electric current. Specifically, the electrical generator 134 is an electromagnetic assembly in which permanent magnets or conductive field windings create a magnetic field and are rotated with respect to induction windings in which an electric current is generated. The electrical generator 132 can be operatively coupled to an internal combustion engine for relative rotation of the windings and magnets.

The other components of the electric powertrain 120 operatively connect and are disposed between the electric power source 122 and the propulsion devices 104 of the mobile machine. To convert the electricity from the power source 122 to the rotational torque utilized by the propulsion devices 104 to apply a tractive force to the terrain surface, the electric motor 124 and transmission 126 are disposed in a sequential arrangement within the transmission path established by the electric powertrain 120. Specifically, the electric motor 124 is disposed upstream toward the power source 122 to convert electricity to motive power and the transmission 126 is downstream toward the propulsion devices 104 for adjusting the rotational speed and torque of the motive force to useable ranges.

When providing motive power to the propulsion devices 104, the electric motor can be referred to as a traction motor 140. The traction motor 140 may be an electromagnetic assembly in which the electrical current is directed through conductive windings to generate a rotating magnetic field. The magnetic field can attract permanent magnets or magnetic materials disposed on a rotor causing rotation of the rotor as it follows the rotation of the magnetic field. The resulting rotational motion is output from an associated motor shaft 142 protruding from the traction motor 140.

The speed range and the associated torque of the traction motor 140 can be a function of the characteristics of the electrical power from the electrical power source 120. For example, the traction motor 140 can be configured to utilize alternating electrical current and the operating motor speed output via the rotating motor shaft 142 can be determined by the frequency of the alternating current. If the power source 122 supplies direct current, the traction motor 130 can be operatively connected through a power converter 144 that converts between direct current and alternating current to match the electrical polarity of the power source 122 to the traction motor 140.

The traction motor 140 may be a variable speed motor and can be associated with a motor controller 146 that adjusts its operation. For example, the motor controller 146 can regulate the frequency and/or current supplied to the traction motor 140 and thus controls the rotational speed and torque delivered through the rotating motor shaft 142. The motor controller 146 can be part of a feedback circuit to actively and responsively adjust the operation of the traction motor 140. The traction motor 140 can be associated with other electrical devices such as voltage convertors, transformers, etc. to further adjust the electrical power from the power source 122. Electrical communication between the power source 122 and traction motor 140 can be established by conductive wires, power cables, or the like.

To receive the motive force output from the traction motor 140 for further adjustment of the rotational speed and, inversely, the torque provided to the propulsion devices 104, the transmission 126 can be directly connected to the motor shaft 142. To physically connect of the transmission 126 with the motor shaft 142 and the propulsion devices 104, the structural transmission housing 150 of the transmission includes a protruding input shaft 152 and an oppositely directed output shaft 154. The input shaft 152 and the output shaft 154 are rotatably attached to the structural transmission housing 150 by bearings.

In an embodiment, the transmission 126 may be a mechanical transmission in which the input shaft 152 and the output shaft 154 are interconnected through a plurality of internal engageable gear sets 156 accommodated within the structural transmission housing 150. The gear sets 150 can be selectively engaged and disengaged in various gear ratios thereby adjusting the rotational speed and torque output from the electric motor 124.

As will be appreciated by those of skill in the art, changing rotational speed, measured in RPMs for example, results in an inverse change in the torque, measured in foot-pounds for example. The individual gears of the gear sets 156 may have different diameters and different numbers of gear teeth protruding about their diameter. The diameters and tooth number can be such that when two different gears are intermeshed together, they will rotate at different rotational speeds.

The transmission 126 can be configured with any suitable number of predetermined or fixed gear sets 156 that represent the different speed ratios of the adjusted rotational speed between a transmission input shaft 152 and the rotational speed at a transmission output shaft 154. The transmission 126 can also be arranged to reverse the rotational motion to, for example, drive the machine 100 in forward or reverse. It should be noted that while the disclosed embodiment of the transmission 126 is a mechanical transmission with discrete gear ratios, aspects of the disclosure can apply to continuously variable transmissions, hydrostatic transmissions, transmissions utilizing planetary gears, etc.

To selectively engage and disengage the plurality of engageable gear sets 156, the transmission 126 may include one or more clutches 160 or the like that can disconnect the transmission input shaft 152 and the transmission output shaft 154 and place the transmission 126 in a neutral configuration so that torque or rotational power cannot be transmitted there through. In an embodiment, the hydraulic clutch 160 can be a multidisc clutch having a plurality of frictional clutch disks 162 that are planar circular shaped disks combined in a parallel arrangement to provide a clutch pack. The clutch disks 162 can be aligned in an axial relation to a clutch axis 164 with a first set of clutch disks 162 fixed to a clutch shaft 166 and a second set of clutch disks fixed to a clutch basket 168 that surround the clutch pack.

The clutch shaft 166 can also be coupled to the transmission input shaft 152 and the clutch basket 168 can be operatively connected with the gear sets 156 inside the structural transmission housing 150. When the clutch disks 162 are axially moved into an abutting frictional contact, the rotational motion of the clutch shaft 166 is transferred to the clutch basket 188. When the clutch plates 162 are axially moved apart, transfer of rotational motion between the clutch shaft 166 and clutch basket 168 ceases. In other embodiments, the hydraulic clutch 160 can have other configurations such as a dual clutch having single plates that are accommodated in separate baskets.

To actuate axial movement of the clutch plates 162 with respect to the clutch axis 144, the hydraulic clutch 160 is operatively associated with a hydraulic clutch actuator 170. The hydraulic clutch actuator 170 can be a hydraulic cylinder with a piston 172 that is moveable within a tubular cylinder body 174. The piston 172 slides axially with respect to the clutch axis 164 and is fixed to the clutch shaft 166 so that axial movement of the piston 172 moves the clutch plates 162 into and out of frictional contact. In other embodiments, the moving components to the hydraulic clutch actuator 170 may also be integrated into the structure of the hydraulic clutch 160 for a compact design.

To cause the piston 172 to move axially with respect to the clutch axis 164, pressurized hydraulic fluid can be introduced to or drained from the tubular cylinder body 174 on either side of the piston 172. Pressurizing the cylinder body 174 on one side of the piston 172 will axially displace the piston 172 toward the other axial end of the cylinder body 174, which may be at a reduced pressure by draining the hydraulic fluid there from. In an embodiment, to normally bias the clutch plates 162 out of fictional contact, a spring 176 can placed in the cylinder body 174 urging the piston 172 in the desired axially direction along the clutch axis 164.

To provide the pressurized hydraulic fluid for operation, the hydraulic clutch 160 is operatively associated with a hydraulic system 180. The hydraulic system 180 can include a hydraulic pump 182 and a fluid reservoir 184. The fluid reservoir 184 can be a vented or enclosed tank that accommodates the hydraulic fluid which the hydraulic pump 182 can pressurize and direct to the transmission 126 via conduits like flexible tubing or rigid pipes. The hydraulic fluid can be any suitable hydraulic fluid such as, for example, a mineral oil or a hydrocarbon-based fluid.

The hydraulic pump 182 can be any suitable type of mechanical fluid pump including, for example, a gear pump that can cause pressurized flow of a fluid and can be a variable speed or fixed speed pump. In an embodiment, the hydraulic pump 182 can be a variable displacement pump that can selectively adjust the hydraulic pressure and/or flowrate of the hydraulic fluid pumped there through. The hydraulic pump 182 may also supply pressurized hydraulic fluid for use by other systems on the mobile machine, such as the hydraulic actuators 118 included on the loading mechanism 110.

To regulate the flow of hydraulic fluid directed from the hydraulic pump 182 to the clutch actuator 170, the hydraulic system 180 can include one or more hydraulic valves. For example, the hydraulic system 180 can include a proportional control valve 186 and a directional control valve 188 that are fluidly connected between the hydraulic pump 182 and the clutch actuator 170 by a fluid conduit such as hydraulic hoses. The proportional control valve 186 can be adjusted to vary the quantity or pressure of the hydraulic fluid directed there through and the directional control valve 188 can be adjusted to change the flow direction of the hydraulic fluid to and from the clutch actuator 170. While FIG. 2 shows the proportional control valve 186 and a directional control valve 188 as different units, in other arrangements, the functionality can be combined as a single hydraulic valve.

The proportional control valve 186 and directional control valve 188 can be solenoid actuated valves having an electromagnetic valve solenoid 190 responsive to an applied electric current. The hydraulic valves can also include an internal spool that is movable inside a valve body to seal closed or fluidly open various ports to fluid flow. When current is applied to the valve solenoid 190, it magnetically moves a plunger connected to the internal spool between different positions selectively controlling fluid flow between the ports. To establish a default configuration, the hydraulic valves can also include a spring 192 that returns the internal spool to a default positon and which the valve solenoid 190 must urge against and compress to move the spool to other configurations.

The proportional control valve 186 can be designed to variably change the flow of hydraulic fluid proportionally to the current applied to the valve solenoid 190. In addition to varying the strength of the applied current, the solenoid can be rapidly actuated to seal and unseal various ports in the hydraulic valve and modulate fluid flow. For example, the proportional control valve 186 can be proportional pressure control valve and the valve output pressure is proportional to the actuation current. In another example, the proportional control valve 186 can be proportion flow control valve and the valve output flowrate is proportional to the actuation current.

The directional control valve 188 can be selectively set by actuation of the valve solenoid 190 to direct pressurized fluid to one axial end of the cylinder body 174 and allow hydraulic fluid to drain from the other axial end, thereby moving the piston 172. The directional control valve 188 can be changed to reverse the fluid flow and move the piston 172 in the opposite axial direction. When hydraulic fluid is drained from the clutch actuator 170, it can be returned to the hydraulic reservoir 184.

To drive the hydraulic pump 182 and pressurize hydraulic fluid, the hydraulic system 170 can be associated with a pump motor 194. The pump motor 194 can be an electromagnetic assembly in which an electric current directed to windings creates a revolving magnetic field that causes rotation of a magnet attached to a motor shaft 195. The motor shaft 195 is connected to and forcibly drives the hydraulic pump 182. To provide electrical power, the pump motor 194 can be electrically connected to the power source 120 that also supplies electricity to the traction motor 140.

Because the power source 122 may produce direct current, the pump motor 194 can be associated with a power converter 196 that coverts power to alternating current appropriate for the pump motor. To variable adjust the current, voltage, and/or frequency of the electrical power, the pump motor 194 may be associated with a motor controller 198. By changing the characteristics of the electrical power, the motor controller 198 can controllably adjust the operating speed and torque of the pump motor 194 that relatedly adjusts operation of the hydraulic pump 182.

To regulate and control coordinated operation of the powertrain 120, an electronic controller 200, also referred to as electronic control module (ECM) or an electronic control unit (ECU) is associated with the electric powertrain 120. The electronic controller 200 can include various circuitry components in any suitable computer architecture for receiving and processing data and software to operate. The electronic controller 200 can process and execute different functions, steps, routines, and instructions written as computer readable software programs and may use data from sources such as data tables, charts, data maps, lookup tables and the like. Additionally, the electronic controller 200 can be responsible for processing functions associated with various other systems on the mobile machine. While the electronic controller 200 is illustrated as a standalone device, its functions may be distributed among a plurality of distinct and separate components.

The electronic controller 200 can include one or more microprocessors 202 such as a central processing unit (CPU), an application specific integrated circuit (ASIC), or a field programmable gate array (FPGA) comprising a plurality of transistors and similar circuits that are capable of reading, manipulating and outputting data in electronic form. The processor 204 can include the appropriate arithmetic and control logic circuitry and associated registers for conducting digital logic operations.

The electronic controller 200 can include non-transient programmable memory 204 or other data storage capabilities that may be in random access memory or more permanent non-volatile forms of data storage media. Common examples of computer-readable memory 204 include RAM, PROM, and EPROM, a FLASH-EPROM, and any other memory chip or cartridge. The memory 204 is capable of storing in software form the computer executable programs including instructions and the data that can be read and processed by the microprocessor 202. The software and data may take the form of instruction sets, rules, definitions, applications, routines, libraries, databases, lookup tables, data sets, and the like.

To communicate with other instruments and actuators associated with the electric powertrain 120, the electronic controller 200 can include various input/output ports 206 and related circuitry. Communication may be established by sending and receiving digital or analog electronic signals across electronic communication lines or communication busses using any suitable data communication protocols, including wireless protocols. The various communication and command channels are indicated in dashed lines for illustration purposes.

In the illustrated embodiment, to regulate operation of the transmission 126, the electronic controller 200 can be communicatively connected to the hydraulic valves including the proportional control valve 186 and the directional control valve 188. For example, the electric powertrain 120 may be associated with one or more electrical sensors 210 that are operatively associated with the valve solenoids 190 that control operation of the proportional and directional control valve 186, 188. The electrical sensors 210 can adjust the electric current that is supplied to valve solenoids 190 and thereby control actuation of the hydraulic valves and adjust the flow of hydraulic fluid to and from the clutch actuator 170. The electrical sensors 210 can also function as meters that communicate information, embodied as electric data signals, about the current and voltage applied to the valve solenoids 190 to the electronic controller 200.

In an embodiment, actuation of the proportional control valve 186 can be proportionally responsive to the strength of the electric current applied to the valve solenoid 190. For example, the strength of the current applied to the valve solenoid 190 determines the force the internal spool urges against the valve spring 192 and thus the displacement of the internal spool within the proportional control valve 186. Displacement of the internal spool is proportional to the fluid flowrate and/or the hydraulic pressure associated with the proportional control valve 186.

In another embodiment, the proportional control valve 186 may be responsive to electrical pulses that are applied to the valve solenoid 190. For example, the number, duration, and rate that electrical pulses are applied to the valve solenoid 190 determines the number of times and duration that the proportional control valve 186 may be opened and closed, which determines the fluid flowrate and hydraulic pressure associated with the proportional control valve 186.

To monitor the conditions of the clutch actuator 170 resulting from controlled actuation of the hydraulic valves, the clutch actuator 170 can be operatively associated with an actuator sensor 212 that is disposed inside the structural transmission housing 150. The actuator sensor 212 can also be electrically communicative with the electronic controller 200 via data lines. The actuator sensor 212 may sense fluid pressure inside the cylinder body 174 which results from the flow of hydraulic fluid to the clutch actuator 170 as controlled by the proportional and directional control valves 186, 188. For example, by comparing the fluid pressure on either side of the piston 172, the electronic controller 200 can determine the force and thus displacement of the clutch actuator 170 with respect to the hydraulic clutch 160 and thus the frictional engagement of the clutch plates 162.

In another embodiments, the actuator sensor 212 can be a proximity sensor that is configured to measure axial displacement of the piston 172 in the cylinder body 174. Displacement of the piston 172 with respect to the clutch axis 164 can be correlated with the frictional engagement of the clutch plates 162 and thus actuation of the hydraulic clutch 160. The proximity sensor can utilize magnetic or optical sensing techniques.

To monitor the response of the transmission 126, the electronic controller 200 can be communicatively associated with one or more transmission sensors 214, 216. For example, to measure the motive force input to the transmission 126, a transmission sensor 214 can be associated with the transmission input shaft 152 protruding from the structural transmission housing 150. The transmission sensor 214 can be a rotary encoder that can directly measures the rotational motion and torque of the transmission input shaft 152 through direct physical contact. In another embodiment, the transmission sensor 214 can indirectly measure the rotation of the transmission input shaft 152. For example, the transmission sensor 214 can be located in close proximity to the transmission input shaft 154 and can utilize infrared or acoustic technique to determine the angular rotational speed.

In an embodiment, to measure the operative effect of the transmission 126 on the motive power transmitted there through, a second transmission sensor 216 can be disposed in association with the transmission output shaft 154 protruding from the structural transmission housing 150. The electronic controller 200 can compare the values and measurements made by the first and second transmission sensors 214, 216 to determine the changes in torque and rotational speed produced by the transmission 126.

In another embodiment, the transmission sensors 214, 216 can be dynamometers that are able to directly measure the motive force or torque input to and output from the transmission 126 in terms of Newton-meters or foot-pounds. The dynamometers can be directly connected to the transmission input shaft 152 and the transmission output shaft 154 to measure the torque being conducted by those structures. The dynamometers can also measure the change or adjust of torque input and output by comparing the readings of the transmission sensors 214, 216

The transmission 126 can also include a gear setting sensor 218 that senses the operative engagement of the gear sets 156. For example, the gear setting sensor 218 can determine which of the plurality of gear sets 156 is operatively engaged and transmitting motive force through the transmission 126. The gear setting sensor 218 can be associated with a gearshift or similar device that controls which of the plurality of gear sets 156 is operatively engaged.

The electronic controller 200 can also be operatively associated and communicatively linked with the hydraulic and electrical components of the hydraulic powertrain 120. For example, to monitor the operating conditions of the hydraulic system 180, the electronic controller 200 can be in electrical communication with a pump sensor 220 that is operatively associated with the hydraulic pump 182. In the embodiments wherein the hydraulic pump 182 is a variable displacement pump, the pump sensor 220 can be configured to measure and adjust the fluid flow rate and hydraulic pressure produced by the hydraulic pump 182.

The electronic controller 200 can also be communicatively connected with the motor controllers 146, 198 that are respectively associated with the traction motor 140 and the pump motor 194. The motor controller 146, 198 can transmit data about the electrical settings supplied to the traction and pump motors 140, 194 including current, voltage and frequency. Using motor specifications, the electronic controller 200 can determine the output including motor speed and torque output produced by the traction and pump motors 140, 194. To measure the electrical conditions of the electrical power source 122, the electronic controller 200 can also communicate with a power source sensor 222 that senses the voltage, current flow, power levels and similar data.

INDUSTRIAL APPLICABILITY

Figure 3:
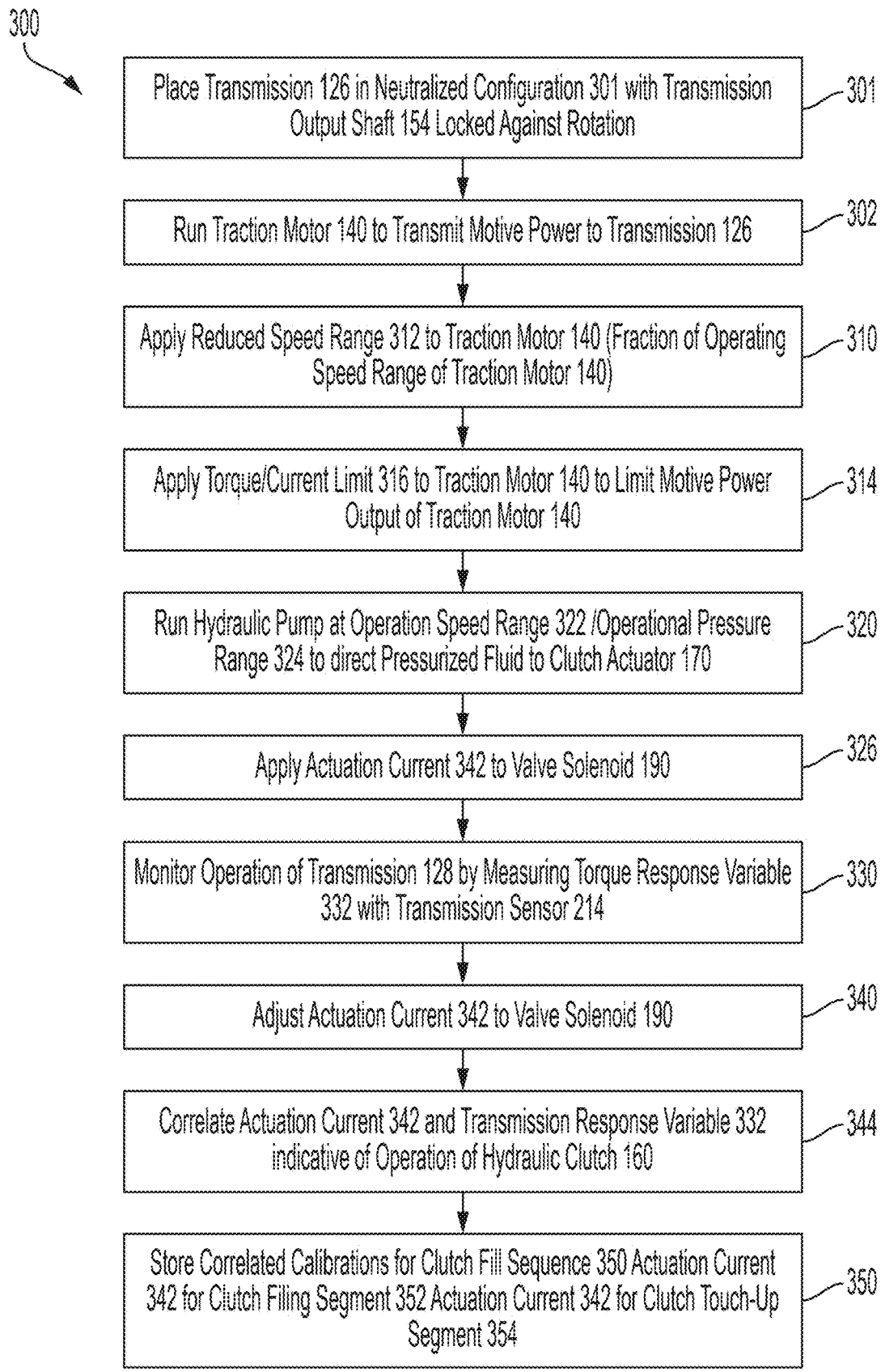
FIG. 3 is a flow diagram of a possible process for calibrating the clutch fill sequence of a hydraulic clutch integrated into the arrangement of the electric powertrain.

Referring to FIG. 3, with continued reference to the previous figures, there is illustrated an embodiment of a process 300 that can be used to calibrate the electric powertrain 120 utilizing the arrangements described herein. Calibration of the electric powertrain 120 is required to coordinate operation of the hydraulic system 180 including the proportional and directional control valve 186, 188 with actuation of the clutch actuator 170. For example, the timing and duration of the clutch fill sequence of the clutch actuator 170 determines the timing with which the clutch plates 162 of the hydraulic clutch 160 are axially moved into or out of frictional engagement and thus determines the operating state and transfer of torque through the transmission 126. The calibration process 300 can determine the characteristics of the clutch fill sequence including the occurrence and duration of a clutch filling segment and a clutch touch-up segment.

The clutch filling segment can correspond to conditions when the clutch actuator 170 is continuing to receive and fill with hydraulic fluid but has insufficient internal fluid pressure or force to displace the piston 172. The clutch plates 162 remain spaced apart and the hydraulic clutch 160 is disengaged. The clutch touch-up segment corresponds to the conditions wherein the clutch actuator 170 fills with a sufficient quantity and volume of hydraulic fluid to axially move the piston 172 causing the clutch plates 162 to axially move adjacently into frictional contact with each other. Rotational motion and torque is thereafter transferred between the clutch plates 162.

The calibration process 300 can be embodied as a computer readable program written as software in a suitable computer programming language and can be executed by the electronic controller 200 associated with the electric powertrain 120. The calibration process 300 can be conducted after assembly of the electric powertrain 120 or after factory installation of the powertrain into the intended mobile machine 100. Results of the calibration process 300 can be used as settings for the operational algorithms and routines used by the electronic controller 200 during operation of the mobile machine 100.

During the calibration process 300, the transmission 126 can be operated in a calibration or testing settings rather than under the operating conditions and settings as may be experienced in field operation. Under such conditions, to prevent the mobile machine 100 from unintentionally propelling, the transmission 126 may be placed in a neutral condition with the output shaft in a locked configuration 301 in which the transmission output shaft 154 is prevented from rotating. The locked configuration 301 can be achieved by applying a parking brake to the transmission output shaft 154 or the connected propulsion devices 104, or by another suitable method.

To direct motive power for operation of the transmission 126, the traction motor 140 can be activated in a motor running step 302. In accordance with the design of the electric powertrain 120, electrical power for the traction motor 140 is supplied by the electric power source 122, for example, the rechargeable battery 130.

During the calibration process 300, the transmission 126 can be operated under reduced or test conditions rather than the actual operational conditions and settings for field operation. Reducing the operating characteristics of the transmission 126 reduces the detrimental effects that may occur during the calibration process 300. For example, reducing the motive force or torque and/or reducing the angular rotational speed through the transmission 126 limits the detrimental effects or damage that can result from premature actuation of the hydraulic clutch 160 due to an aggressive filling sequence.

Accordingly, in a speed reduction operation 310, the electronic controller 200 can direct the motor controller 146 to operate the traction motor 140 in accordance with a reduced speed range 312. The reduced speed range 312 can be a fraction of the rated or operational speed range of the traction motor 140, for example, 50%, 25%, 10%, etc. For example, if the rated speed range of the traction motor 140 is 1800 RPM, the reduced speed range may be approximately 180 RPM. The motor controller 146 can apply the reduced speed range 312 by adjusting and limiting the frequency of the electrical power directed to the traction motor 140.

In a torque limitation operation 314, the electronic controller 200 can also direct the motor controller 146 to apply a torque or current limit 316 to the traction motor 140. For example, if the load applied to the traction motor 140 increases, the traction motor will attempt to draw more current from the power source 120 to responsively generate more torque. The increased load on the traction motor 140 can be caused by frictional engagement of the clutch plates 162 in the hydraulic clutch 162 and the rotational resistance that results, which may occur unexpectedly due to a premature fill segment occurring with the clutch actuator 170. The torque/current limit 316 places an upper limit or threshold on the electric current that the traction motor 140 can demand and draw from the power source 122 and thus limits the torque that the traction motor 140 can produce.

Because the current demanded or drawn by the traction motor 140 cannot exceed the torque/current limit 316, the traction motor is prevented from drawing additional current to accelerate and/or generate additional torque. Accordingly, if the hydraulic clutch 160 engages unexpectedly, transmission of motive force through the electric powertrain 120 is limited by the torque/current limit 316 and possible damage to the hydraulic clutch 160 or clutch plates 162 or unintended motion of the mobile machine 100 is avoided. Additionally, the limiting of traction motor torque/current has the added benefit of amplifying the traction motor reaction to the clutch frictional engagement, increasing ease of detection and accuracy of calibration results.

To produce pressurized hydraulic fluid for the calibration process 300, the hydraulic system 180 can be activated by a pump running operation 320. For example, the common electric power source 122 can supply the pump motor 194 with electric power that is converted to motive forces transmitted to the hydraulic pump 182. Because the traction motor 140 and pump motor 194 are arranged in parallel and can be operated independently, the reduced speed range 312 and the torque/current limits 316 are not applied to the pump motor 194. The hydraulic pump 194 moreover is operated in accordance with an operational speed range 322 and operation pressure range 324 that corresponds to the actual field conditions and settings for the hydraulic system 180 or any other necessary speed and pressure to facilitate calibration. The operational speed range 322 and operation pressure range 324 are applied and maintained upon the hydraulic pump 182 by the electronic controller 200 via the pump sensor 220.

In conjunction with the pump running operation 320, the calibration process 300 includes a solenoid actuation operation 326. In the solenoid actuation operation 326, an activation current 342 is applied to the valve solenoid 190 to regulate the flow of hydraulic fluid between the hydraulic pump 182 and the clutch actuator 170. The strength of the actuation current 342 or the characteristics of the current pulses to the valve solenoid 190 can be measured and controlled by the electronic controller 200 via the electrical sensors 210

The calibration process 300 actively monitors operation of the transmission 126 to indirectly assess operation of the hydraulic clutch 160 and the hydraulic system 180. For example, in a transmission monitoring operation 330, the electronic controller 200 can monitor actuation and engagement of the hydraulic clutch 160 by sensing a transmission response variable 332. For example, using the first transmission sensor 214 associated with the transmission input shaft 152, the electronic controller 200 senses the rotational speed of the transmission input shaft. The rotational speed of the transmission input shaft 172 can serve as the transmission response variable 332 observed by the transmission monitoring operation 330.

While the empty clutch actuator 170 is filling with pressurized hydraulic fluid, the hydraulic clutch 160 is not engaged and the clutch plates 162 are continuing to freely rotate with respect to each other. The motive force applied by the traction motor 140 to the transmission input shaft 152 is not effected and continues to rotate without restriction.

Once the clutch actuator 170 is filled with pressurized hydraulic fluid, the piston 172 is movably displaced in the cylinder body 174 axially moving the clutch plates 162 into frictional contact and engaging the hydraulic clutch 160. The applied load created by the frictional engagement of the clutch plates 162 can cause a reduction in the rotational speed of the transmission input shaft 172. The first transmission sensor 214 can sense the change in rotational speed which serves as the transmission response variable 332.

Furthermore, the transmission response variable 332 can be indicative of the degree of frictional engagement or slip between the clutch plates 162 as determined by the change in rotational speed of the transmission input shaft 172 as sensed by the transmission sensor 214 while the hydraulic clutch 160 engages. The difference in rotational speed of the transmission input shaft 172 may be proportional to the engagement of the clutch plates 162. Conversely, if the transmission sensor 214 does not detect a change in rotational speed of the transmission input shaft 152, the hydraulic clutch 160 remains disengaged with the clutch plates 162 continuing to freely rotate.

In another example, during the calibration process, the transmission 126 can be operatively connected to a dynamometer that measures the torque or motive force output via the transmission output shaft 154. If the second transmission sensor 216, which may be the dynamometer, determines the transmission output shaft 154 is rotating or producing torque, then the hydraulic clutch 160 is engaged. The transmission response variable 332 can therefore correspond to the torque or motive force output via the transmission output shaft 154 and can be measured in units such as Newton-meters or foot-pounds.

In a further example, the calibration process 300 could also directly monitor the fluid conditions inside the hydraulic clutch 160 via the actuator sensor 212 in an actuator monitoring operation. For example, the actuator sensor 212 may measure the clutch fluid pressure on either axial end of the cylinder body 174. The electronic controller 200 can be programmed to determine the configuration and displacement of the piston 172 within the cylinder body 174 and thus the actuation of hydraulic clutch 170. Moreover, the electronic controller 200 can combine data from the actuator sensor 212 and transmission sensors 214/216 to correlate the clutch fluid pressure to the transmission response variable 332 indicative of engagement of the hydraulic clutch 160.

For calibration purposes, the calibration process 300 can include an adjustment operation 340 in which the electronic controller 200 varies and adjusts the electric actuation current 342 applied to actuate the valve solenoids 190 associated with the proportional and directional control valves 186, 188. For example, the actuation current applied to the valve solenoid 190 of the proportional control valve 186 can be proportional to the flowrate and hydraulic pressure produced by the proportional control valve 186.

In a correlation operation 344, the electronic controller 200 can coordinate the measurements made of the actuation current 342 applied to the valve solenoids 190 to the operation of the hydraulic clutch 170. For example, the measurements or readings of the actuation current 342 during the adjustment operation 340 can be correlated with the corresponding measurements or readings made of the transmission response variable 332 during the transmission monitoring operation 330.

Through the correlation operation 344, the calibration process 300 produces calibration results for the clutch fill sequence. The clutch fill sequence 352 may include discrete fill segments including a clutch filling segment 354 and a clutch touchup segment 356. The calibration correlates the clutch filling segment 354 and the clutch touch-up segment 356 with the values obtained from the transmission monitoring operation 330 and the adjustment operation 340.

The calibration process 300 can include a calibration storage step 350 that stores the correlations for the calibrated hydraulic clutches 160 of the transmission. The calibration storage step 350 includes the relations between the clutch filing segment 354 and the clutch touch-up segment 356 and the corresponding actuation current 342 in terms of strength and duration as determined by monitoring the transmission response variable 332. Specifically, to calibration storage step 350 stores the values of the actuation current 342 in terms of strength and duration to achieve the target filing time of the clutch filling segment 354 and stores the values of the actuation current 342 in terms of strength and duration to achieve a target clutch torque in a clutch touchup segment 356. The electronic controller 200 can store in the data memory 206 the different readings made by the electrical sensors 210 of the varied strength or pulse characteristics of the actuation current 342 as applied to the valve solenoids 190 during the clutch file sequence 352.

For example, the rotational speed of the transmission input shaft 152 may serve as the transmission response variable 332 and changes in the rotational speed can be measured by the transmission sensor 214. When the clutch actuator 170 becomes full with hydraulic fluid to axially move the piston 172 within the cylinder 174, and thus axially moving the spaced apart clutch plates 162 into frictional contact, the hydraulic clutch 160 changes from the clutch filling segment 354 to the clutch touch-up segment 356. The frictional contact and force and motion transfer between the abutting clutch plates 162 will change the rotational speed of the transmission input shaft 152, which is sensed by the transmission sensor 214.

Accordingly, by monitoring the transmission response variable 332, which is representative of the clutch fill sequence 352 and indicative of either the clutch filling segment 354 or clutch touch-up segment 356, the calibration process can calibrate the actuation current 342. Specifically, adjustments made to the actuation current 342 applied to the solenoid valve 190 determine and the flowrate and/or hydraulic pressure of the hydraulic valves and thus the actuation timing of the hydraulic clutch fill segment 354 and/or the clutch torque capacity of the clutch touch-up segment 356. The adjustments of the strength and/or duration of the actuation current 342 during the adjustment operation 340 are recorded and correlated with the corresponding clutch filling segment 354 or clutch touch-up segment 356. As a result, the calibration process 300 can develop a clutch fill sequence 352 including the desired timing for the clutch filling segment 354 and the torque capacity of the touch-up segment 356 as determined by the applied actuation current 342 to the valve solenoid 190.

The clutch fluid pressure as determined by the actuator sensor 212 can similarly be correlated with the clutch fill segments. For example, low values of clutch fluid pressure correspond to the clutch filling segment 354 as hydraulic fluid fills the clutch actuator 170 and high values of the clutch fluid pressure correspond to the clutch touch-up segment 356 as the clutch actuator 170 becomes full and the piston 172 begins to axially move within the cylinder body 174 engaging the clutch plates 162.

The correlated values of the transmission response variable 332, and the actuation current 342, and the clutch filling and clutch touch-up segments 354, 356 can be stored in the data memory 206 of the electronic controller 200 and used to operate the electric powertrain 120 in the field under actual operating conditions.

Figure 4:
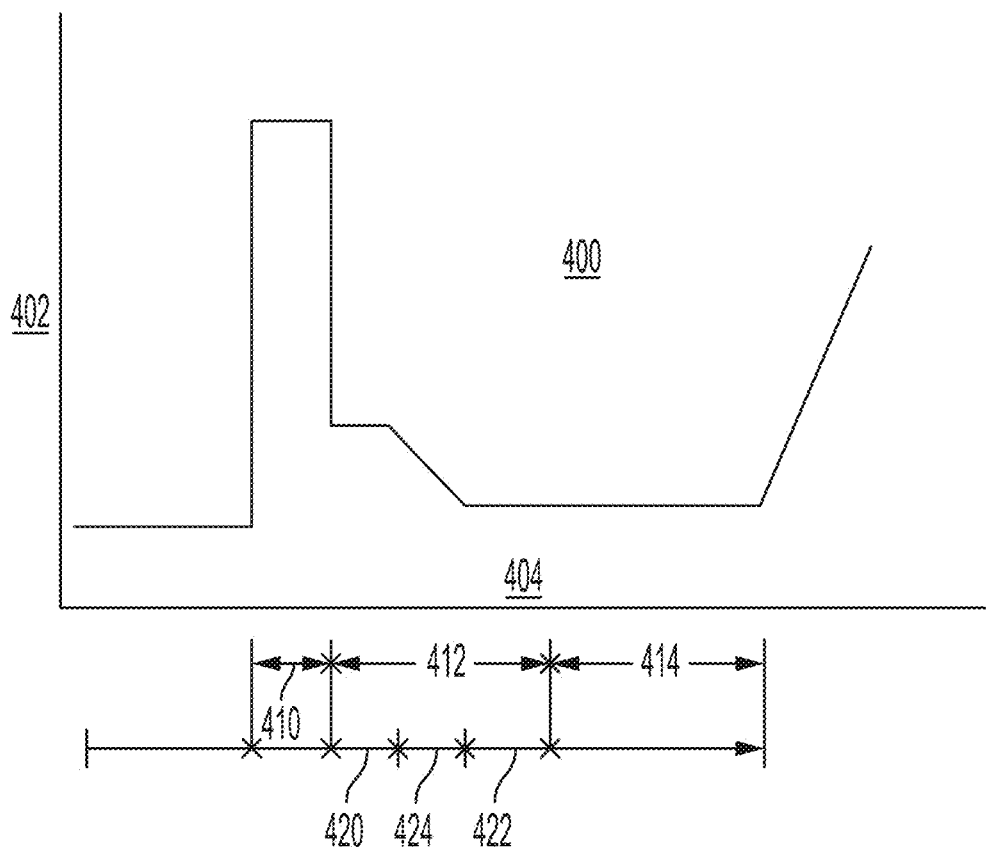
FIG. 4 is a graph of hydraulic pressure applied to a clutch actuator during the touch-up segment of a clutch fill sequence having first and second holding stages.

Referring to FIG. 4, there is illustrated a chart comparing the fluid pressure applied to a clutch actuator during a clutch fill sequence 400 that may be developed in part by the calibration process 300. The clutch fill sequence 400 can be applied to hydraulic clutches 160 having a plurality of clutch plates 162 arranged into a clutch pack such as described in FIG. 2, although aspects of the clutch fill sequence 400 an be applied to any suitable clutch arrangement and design. In the chart, the y-axis can represent the applied fluid pressure directed to the clutch actuator, referred to an actuator pressure 402, and the x-axis can be designated as time 404.

The clutch fill sequence 400 can include discrete segments that are characterized by different operating configurations of the clutch actuator 160 associated with different operational conditions or responses and that change with respect to time 404. For example, the clutch fill sequence 400 can include a clutch filling segment 410 in which the partly empty clutch actuator 170 associated with the hydraulic clutch receives and fills with hydraulic fluid, a clutch touch-up segment 412 in which the clutch actuator 170 becomes full of hydraulic fluid while moving the clutch piston and into frictional abutment with the clutch plates but transmits no torque, and a clutch clamped segment or condition 414 in which the clutch plates 152 are brought into a clamped state substantially rotating together with respect to the clutch axis 164. In the clutch clamped state 414, the clutch plates 162 may slightly slip but can transfer torque and load. The hydraulic flow during the different segments of the clutch fill sequence 400 are controlled by the proportional control valve 186 and/or the directional control valve 188 of the hydraulic system 180.

During the clutch filling segment 410, the cylinder 174 of the clutch actuator 170 may be partially empty and the clutch plates 162 are axially spaced apart along the clutch axis 164, for example, by the biasing force of the spring 176. In the clutch filling segment 410, the spaced apart clutch plates 162 are free to rotate with respect to each other and the hydraulic clutch 160 is disengaged and incapable of transmitting a torque load.

To quickly fill the clutch actuator 170 and initiate a gear shift, the clutch filling segment 410 can induce high flow rates of the hydraulic fluid from the hydraulic pump 182 to fill the volume of the clutch actuator 170. The high flow rates can be controlled by the proportional control valve 186, the settings for which may be adjusted by the associated valve solenoid 190. To increase the flow rate, therefore, the actuation current 342 applied to the valve solenoid 190 is set at a high level or at a maximum, significantly opening the proportional control valve 186 to fluid flow.

At clutch touch-up segment 412, the volume of the clutch actuator 170 is substantially full with hydraulic fluid and the clutch plates 162 move into initial contact. However, during clutch touch-up segment 412, the actuator pressure and forces applied to the adjacent clutch plates 162 is relatively low and any load or torque applied to the hydraulic clutch 160 may cause the clutch plates to 162 frictionally slip with respect to each other. In other words, the clutch plates 162 can rotate at different relative speeds depending upon the loads applied to the hydraulic clutch 160. During the clutch touch-up segment 412, the hydraulic clutch 160 is incapable of transmitting loads or torque of any significance, which instead causes the clutch plates 162 to slip.

The clutch touch-up segment 412 can be characterized by reducing the flow rate of hydraulic fluid from the hydraulic pump 182 to the clutch actuator 170 allowing the clutch actuator 170 to fill completely at lower actuator pressures while the piston 172 urges against the adjacent clutch plates 162. Accordingly, the actuation current 342 applied to the valve solenoid 190 can be reduced, lowering the hydraulic flowrate through the proportional control valve. The lowered fluid flowrate can also correspond to a lowered actuator pressure 402 corresponding the clutch touch-up segment 412 of the curve for the clutch fill sequence 400.

During the clutch clamped segment or condition 414, the cylinder body 174 is completely full of hydraulic fluid and the piston 172 is fully moved to one axial end. The adjacent clutch plates 162 are firmly held in frictional contact but may slip at different rotational speeds. Any load or torque applied may be transmitted through the hydraulic clutch 160. The clutch clamped segment or condition 414 is characterized by the inability of the cylinder body 174 to receive additional fluid, and the proportional control valve 186 may modulate the actuator pressure 402. The torque or load transmitted though the clutch actuator 160 during the clamped segment or condition 414 is proportional to the actuator pressure 402.

To quickly fill the clutch actuator 160 with fluid while the clutch fill sequence corresponds to the touch-up segment 412, the clutch touch-up segment can be more specifically operated in different stages that are associated with different actuator pressures 402. For example, as shown in FIG. 4, the clutch touch-up segment 412 can include a first touch-up stage 420 and a second touch-up stage 422 that correspond with different levels of actuation pressure 402. For example, the first touch-up stage 420 can correspond to a higher level of actuation pressure 402 to continue directing a greater quantity or higher flowrate of hydraulic fluid to the clutch actuator 160. The actuation pressure level 402 can be consistent for the duration of the first touch-up stage 420. The first touch-up stage 420 can be configured to facilitate completion of the filling of the cylinder body 174 quickly and in a repeatable manner and to complete the touch-up contact between adjacent clutch plates 162 during the overall touch-up segment 420.

The second touch-up stage 422 can correspond to a lower level of actuation pressure 402 to continue directing a reduced quantity or lower flowrate of hydraulic fluid to the clutch actuator 160. The actuator pressure 402 of the second touch-up stage 422 can be consistent during the time duration 404 of the second touch-up stage. The second touch-up state 422 can be configured to complete the filling of the cylinder body 174 in a repeatable manner and at a low pressure when touch-up contact between adjacent clutch plates 162 occurs during the second touch-up segment 422.

The difference in actuation pressure 402 between the first touch-up stage 420 and the second touch-up stage 422 can be controlled by the actuation current 342 applied to the valve solenoid. The electronic controller 200 can be programmed to apply appropriate current strengths to the valve solenoid to produce the desired hydraulic pressures and flowrate to the clutch actuator 170 during the touch-up segment 412.

To transition between the first touch-up stage 420 and the second touch-up stage 422, the touch-up segment 412 can include a transition stage 424. The transition stage 424 is characterized by changing the actuator pressure 402 from the higher first touch-up stage 420 to the lower second touch-upstage 422.

The transition stage 424, for example, can be a fixed rate transition in which the change in actuator pressure 402 occurs at a fixed rate with respect to the time duration 404. The transition stage 424 is characterized by a constant slope between the actuator pressure of the first touch-up stage 420 and the actuator pressure of the second touch-up stage 422. In another example, the transition stage 424 can have an exponentially decreasing or declining function or rate, or can have another suitable function or rate for transitioning from the actuator pressure 402 of the first touch-up stage 420 to the second touch-up stage 422. The electronic controller 200 can consistently change the actuation current 342 applied to the valve solenoid 190 to create the fluid flow and hydraulic pressure corresponding to the transition stage.

The time durations 404 for each of the first touch-up stage 420, the second touch-up stage 422 and the transition stage 424 can be determined by experiment. For example, the time durations 404 and the actuation pressures 402 can be configured to quickly complete filling of the clutch actuator 160 during the touch-up segment 412 when the clutch plates 162 are in contact but unable to transfer torque. By separating the touch-up segment 412 into different stages, electronic controller 200 can exert better control and repeatability over the clutch fill sequence 400

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:
1. A method of calibrating a transmission for an electric powertrain comprising:
running a traction motor in accordance with a reduced speed range to direct motive power to the transmission;
running a hydraulic pump in accordance with an operational speed range to pressurize hydraulic fluid;
applying an actuation current to a valve solenoid associated with a hydraulic valve to direct the hydraulic fluid to a clutch actuator and engage a hydraulic clutch;
monitoring a transmission response variable; and
correlating the transmission response variable with the actuation current.

2. The method of claim 1, wherein the transmission response variable is sensed by a transmission sensor associated with a transmission input shaft to the transmission.

3. The method of claim 2, wherein the transmission sensor senses a change in rotational speed of the transmission input shaft.

4. The method of claim 1, wherein the transmission response variable is sensed by a transmission output sensor associated with a transmission output shaft from the transmission.

5. The method of claim 1, wherein the transmission response variable is clutch fluid of the hydraulic clutch.

6. The method of claim 1, wherein the step of correlating including associating the transmission response variable to a clutch fill sequence.

7. The method of claim 6, wherein the clutch fill sequence includes a clutch filling segment and a clutch touch-up segment.

8. The method of claim 1, further comprising applying a torque/current limit to the traction motor.

9. The method of claim 1, wherein the reduced speed range applied to the traction motor is less than an operating speed range to be applied to the traction motor.

10. The method of claim 1, wherein the hydraulic pump is operatively driven by a pump motor electrically connected to a common electrical power source with the traction motor.

11. The method of claim 1, wherein the hydraulic valve is a proportional pressure control valve and the valve output pressure is proportional to the actuation current.

12. The method of claim 1, wherein the hydraulic valve is proportion flow control valve and the value output flowrate is proportional to the actuation current.

13. An electric powertrain comprising:
a transmission including a plurality of selectively engageable gear sets, a hydraulic clutch including a plurality of clutch plates engageable with each other, and clutch actuator configured to move the clutch plates into and out of engagement;
a traction motor operatively connected to direct a motive force to the transmission, the traction motor including a motor controller configured to operate the traction motor at a reduced speed range;

a hydraulic system including a hydraulic pump fluidly connected to a hydraulic valve fluidly connected to the clutch actuator to direct hydraulic fluid thereto, the hydraulic valve operatively associated with a valve solenoid;

an electronic controller configured to apply an actuation current to the valve solenoid; to monitor transmission response variable, and to correlate the transmission response variable with the actuation current.

14. The electric powertrain of claim 13, further comprising a transmission sensor operatively associated with one of a transmission input shaft and a transmission output shaft to sense the transmission response variable.

15. The electric powertrain of claim 14, wherein the transmission output variable is one or more of a transmission speed and a transmission torque.

16. The electric powertrain of claim 15, wherein the motor controller is further configured to apply a torque/current limit to the traction motor.

17. The electric powertrain of claim 13, further comprising an actuator sensor operatively associated with the clutch actuator to sense the clutch fluid pressure.

18. The electric powertrain of claim 13, wherein the hydraulic system includes a pump motor operatively connected to the hydraulic pump; and wherein the traction motor and the pump motor are electrically connected to a common electrical power source.

19. The electric powertrain of claim 13, wherein the hydraulic valve is one or more of a proportional pressure control valve wherein the valve output pressure is proportional to the actuation current and a proportional flow control valve and the output flowrate is proportional to the actuation current.

20. The electric powertrain of claim 13, wherein the electronic controller is further configured to the transmission response variable and the actuation current to a clutch fill sequence including a clutch filling segment and a clutch touch-up segment.

* * * * *